(12) United States Patent
Shimizu et al.

(10) Patent No.: US 6,627,330 B1
(45) Date of Patent: Sep. 30, 2003

(54) ALUMINUM ALLOY BRAZING SHEET FOR VACUUM BRAZING EXHIBITING EXCELLENT CORROSION RESISTANCE, AND HEAT EXCHANGER USING THE BRAZING SHEET

(75) Inventors: Masaki Shimizu, Nagoya (JP); Haruhiko Miyachi, Okazaki (JP); Toshihiko Fukuda, Nagoya (JP); Hiroshi Ikeda, Nagoya (JP); Yoshifusa Shoji, Nagoya (JP)

(73) Assignees: Sumitomo Light Metal Industries, Ltd., Tokyo (JP); Denso Corporation, Aichi (JP)

( * ) Notice: Subject to any disclaimer, the term of this patent is extended or adjusted under 35 U.S.C. 154(b) by 0 days.

(21) Appl. No.: 09/596,934

(22) Filed: Jun. 19, 2000

(30) Foreign Application Priority Data

Jun. 23, 1999 (JP) ............................................. 11-176594

(51) Int. Cl.$^7$ ......................... B32B 15/01; B32B 15/20; F28F 19/06
(52) U.S. Cl. .................... 428/654; 428/933; 165/134.1; 148/528; 148/535
(58) Field of Search ................................ 428/654, 933; 165/133, 134.1, 905; 148/528, 535

(56) References Cited

U.S. PATENT DOCUMENTS

| | | | | |
|---|---|---|---|---|
| 5,021,106 A | * | 6/1991 | Iwai et al. .................... 148/437 |
| 5,292,595 A | * | 3/1994 | Yamauchi et al. ........... 428/654 |
| 5,744,255 A | * | 4/1998 | Doko et al. .................. 428/654 |
| 6,063,510 A | * | 5/2000 | Inabayashi et al. .......... 428/654 |
| 6,129,143 A | * | 10/2000 | Hasegawa et al. ........... 164/133 |

FOREIGN PATENT DOCUMENTS

| | | | |
|---|---|---|---|
| EP | 0823305 A2 | * | 2/1998 |
| JP | 10-036932 A | * | 2/1998 |

* cited by examiner

*Primary Examiner*—George Wyszomierski
*Assistant Examiner*—Janelle Combs Morillo
(74) *Attorney, Agent, or Firm*—Flynn, Thiel, Boutell & Tanis, P.C.

(57) ABSTRACT

An aluminum alloy brazing sheet has a quad-layer structure made of an outer filler material, intermediate layer material, core material, and inner filler material. The core material contains 0.5–1.6% of Mn, 0.10–0.50% of Cu, 0.05–0.50% of Mg, and 0.06–0.30% of Ti, and, as impurities, 0.5% or less of Fe, 0.5% or less of Si, and 0.1% or less of Zn, with the remainder being Al and unavoidable impurities; the intermediate layer material contains 0.2–1.5% of Mg and at least one of 0.5–4% of Zn, 0.005–0.2% of In, and 0.01–0.2% of Sn, and, as impurities, 0.3% or less of Si, 0.3% or less of Fe, 0.05% or less of Cu, 0.05% or less of Mn, and 0.3% or less of Ti, with the remainder being Al and unavoidable impurities. The thickness of the intermediate layer material is 50 μm or more and no more than the thickness of the core material. The outer filler material and the inner filler material are Al—Si—Mg alloys, the outer filler material, preferably including at least one of 0.005–0.2% of In and 0.01–0.2% of Sn.

9 Claims, 2 Drawing Sheets

ALUMINUM ALLOY BRAZING SHEET FOR VACUUM BRAZING EXHIBITING EXCELLENT CORROSION RESISTANCE, AND HEAT EXCHANGER USING THE BRAZING SHEET

BACKGROUND OF THE INVENTION

1. Field of the Invention

The present invention relates to an aluminum alloy brazing sheet for vacuum brazing which exhibits excellent corrosion resistance and is used for heat exchangers such as an evaporator or an intercooler for an air conditioner used in automobiles. The present invention also relates to a heat exchanger using the brazing sheet.

2. Description of Background Art

A heat exchanger made of an aluminum alloy has been used for automotive heat exchangers such as an oil cooler, inter cooler, heater, evaporator for an air conditioner, and a condenser, and an oil cooler for hydraulic devices and industrial machines. The structure of such a heat exchanger has been modified in various ways. For example, for an evaporator and a condenser, a corrugated-fin type heat exchanger fabricated by brazing a corrugated brazing sheet fin material and a serpentined porous extruded flat tube has mainly been utilized. At present, a drawn-cup type heat exchanger exhibiting improved heat exchanging performance is widely used for an evaporator. Such a drawn-cup type heat exchanger is fabricated by forming a fluid passage between laminated core plates produced by press-forming a brazing sheet clad on both sides thereof with a brazing material, laminating a corrugated fin material made of an aluminum alloy on the core plates, and brazing these materials.

As a core plate for a drawn-cup type heat exchanger, a brazing sheet consisting of a core material which comprises an aluminum alloy such as an Al—Mn, Al—Mn—Cu, Al—Mn—Mg, Al—Mn—Cu—Mg aluminum alloy containing Mn as an essential component, such as a JIS3003 alloy or 3005 alloy is used. Either one or both sides of the core material is clad with an Al—Si—Mg filler material. As a fin material, an Al—Mn, Al—Mn—Cu, Al—Mn—Mg, or Al—Mn—Zn aluminum alloy is used. The core plate and the fin material are generally joined by vacuum brazing.

However, the core material of the above brazing sheet, which comprises Mn as an essential component, exhibits inadequate pitting-corrosion resistance. Therefore, when applied to a fluid passage for a coolant, perforation leakage may occur due to pitting corrosion from the outer surface (surface in contact with air). To deal with this problem, a method of using a fin material having a potential less noble than that of a fluid passage material such as an Al—Mn—Zn alloy or an Al—Mn—Sn alloy has been proposed to prevent the fluid passage material from being corroded by the sacrificial anode effect of the fin material. However, this method has the following problems when applied to an evaporator. Specifically, when a coolant in a heat exchanger evaporates to absorb heat from the air, the temperature of the surface of the heat exchanger decreases and causes dew to form on the fin. This dew has a significantly low electrical conductivity because of the low impurity content. A corrosion resistant current generated by the sacrificial anode effect of the fin reaches only to near the joint section of the fin and no sacrificial anode effect occurs in the area apart from the joint section. Moreover, $SO_4^{2-}$, $NO_3^-$, or the like contained in exhaust gas of automotive fuel such as diesel fuel or gasoline or emitted from factories is mixed in the dew to concentrate in the pitting corrosion. This significantly promotes corrosion, to cause perforation corrosion in the core plate, whereby a coolant tends to leak.

To solve these problems, a quad-layer clad material has been proposed (Japanese Patent Application Laid-open No. 60-251243). In the quad-layer clad material, an intermediate layer material made of an aluminum alloy having a potential 20–100 mV less noble than that of the core material is provided between the core material and the filler material. However, although the pitting-corrosion resistance is improved in this quad-layer clad material, it is difficult to ensure pressure resistance for heat exchangers due to the inferior strength after brazing. Moreover, joining between each layer during hot rolling tends to be inadequate. Furthermore, the quad-layer clad material tends to warp due to the nonuniform strength and elongation between each layer. In addition, an uneven cladding rate hinders fabrication. In order to improve pitting-corrosion resistance, the addition of Ti, Cu, Mg, and Si to an Al—Mn alloy constituting a core material of a core plate material for a drawn-cup type heat exchanger has been proposed. The addition of these elements forms a structure exhibiting periodic differences in the Ti concentration in the direction of the plate thickness. This material exhibits good corrosion resistance in a region where there are many sea salt particles. However, in a region where the amount of exhaust gas is too great, the effect is inadequate.

A method of adding Zn to the brazing material of the above core plate material has been proposed. This method is intended to provide corrosion resistance by the sacrificial anode effect of Zn. Zn is effective as a sacrificial anode. However, since the vapor pressure of Zn at the brazing temperature is higher than the degree of vacuum in a brazing furnace, the Zn almost all evaporates during vacuum brazing and does not remain in the core plate material, whereby no sacrificial anode effect occurs. Another method which comprises coating an evaporator with Zn after brazing and diffusing the Zn by heating has also been proposed. However, this method increases the number of fabrication steps and the cost. When providing an intermediate layer material between the core material and the filler material, the difference in the strength or elongation between the intermediate layer material and the core material causes the clad material to warp during hot rolling or results in inadequate joining between each layer during clad rolling. Moreover, the clad thickness may become uneven. Warping can be reduced to some extent by decreasing the rolling rate. However, this decreases production efficiency and is not suitable for mass production.

Furthermore, penetration of melted braze into the core material has been pointed out as a problem. In the case of a drawn-cup type heat exchanger, a fluid passage is formed by press-forming annealing materials (full-annealed materials) used as core plate materials and joining the annealing materials by brazing. The strain introduced during press forming recrystallizes and disappears during brazing. However, in the case of an Al—Mn alloy, if the amount of strain is small, the strain does not completely disappear at the brazing temperature due to the increased recrystallization temperature, whereby subgraining formed by the recovery of the strain remains. Because diffusion easily occurs at the subgrain boundary, a large amount of Si filler diffuses into the core material, thereby resulting in lack of filler. The area where the braze penetrated exhibits inferior corrosion resistance and decreased strength. To solve this problem, a method of homogenizing the core material at a high temperature, or a method of performing final annealing at a high temperature for a long period of time has been proposed. However, these methods are still inadequate.

SUMMARY OF THE INVENTION

In order to obtain a quad-layer clad aluminum alloy brazing sheet for vacuum brazing, which comprises a core material, intermediate layer material, and filler material on both sides of the core material, and can solve the above problems in a fluid passage material of an aluminum alloy heat exchanger, the present inventors have conducted extensive studies on the composition of the intermediate layer material and properties of the core material to provide excellent corrosion resistance and to solve problems in the fabrication of a clad material. As a result, the inventors have found that the following phenomena (1) to (4) occur by (a) limiting the Fe content in the intermediate layer material, (b) adding Zn to the intermediate layer material, (c) adding In and Sn to the intermediate layer material, and (d) allowing a predetermined amount of strain to remain in the core material.

(1) Si in the brazing material joined on both sides of the brazing sheet diffuses into the intermediate layer material and the core material during heating for brazing. The diffusion rate of Si increases particularly at the crystal grain boundary and therefore Si preferentially penetrates this area. As a result, the melting point decreases near the crystal grain boundary of the intermediate layer material, thereby causing local melting and increasing the amount of an Si solid solution. Moreover, Cu in the core material diffuses into the intermediate layer material in an amount greater than the diffusion between the solid phases. This decreases the sacrificial corrosion resistance effect of the intermediate layer material, whereby the intermediate layer material is perforated at an early stage. However, the grain size of the intermediate layer material becomes coarse after being heated for brazing by limiting the Fe content and the Si content in the intermediate layer material. This decreases the line length of the grain boundary per one cross section, which is the Si diffusion site. Because of this, the intermediate layer material having superior sacrificial corrosion resistance properties can be ensured over a wide area, thereby remarkably improving perforation durability.

(2) In the case of adding Zn to the intermediate layer material, Zn diffuses into the filler material near the surface of the quad-layer clad material and evaporates during brazing. However, Zn remains at the side of the core material and diffuses into the core material. Therefore, the Zn concentration peaks near the interface between the intermediate layer material and the core material and decreases at the side of both the filler material and the core material. Because of this, the electric potential of the quad-layer clad material becomes the lowest potential near the interface between the intermediate layer material and the core material, and gradually becomes noble toward the inner side of the core material. Therefore, the intermediate layer material and the core material on the side of the intermediate layer material act as a sacrificial anode for the core material on the side of the filler material, thereby preventing perforating corrosion. The addition of In and Sn to the filler material further improves corrosion resistance, since the brazing material also acts as a sacrificial anode.

(3) In the case of adding In and Sn to the intermediate layer material, In and Sn diffuse into the filler material near the surface of the quad-layer clad material, but scarcely into the core material. In and Sn diffused into the filler material do not evaporate and remain therein. Therefore, the concentration of In and Sn are uniformly distributed over almost the entire section of the intermediate layer material. The intermediate layer material and the core material in contact with the intermediate layer material act as a sacrificial anode to prevent perforating corrosion. In the case of adding In and Sn to the filler material, the filler material exhibits a significant sacrificial anode effect.

(4) It is important to control precipitated grains of the core material to improve brazability (erosion resistance). Moreover, it is considered to be advantageous to allow the strain to remain in the core material and to recrystallize during heating for brazing into a state in which the substructure does not remain. However, when the strain is allowed to remain in the core material, if the amount of strain is too great, cracking occurs during press forming. If the amount of strain is too small, erosion occurs during heating for brazing, thereby resulting in decreased brazability. Therefore, it is difficult to ensure both the press-formability and erosion resistance at the same time. The present inventors have found that the amount of the strain remaining in the core material can be quantified and the range thereof can be limited by forming a quad-layer structure, making the intermediate layer material into a full-annealed state, and limiting the ratio of the micro-Vickers hardness of the core material in a raw material state to that of the core material in a full-annealed state, whereby press-formability as well as erosion resistance can be ensured.

The present invention has been achieved based on the above findings. An object of the present invention is to provide an aluminum alloy brazing sheet for vacuum brazing which excels in corrosion resistance, clad rolling characteristics, and formability, and a heat exchanger using the aluminum alloy brazing sheet.

In order to achieve the above object, an aluminum alloy brazing sheet for vacuum brazing exhibiting excellent corrosion resistance of the present invention is characterized as follows.

1. An aluminum alloy brazing sheet with a quad-layer structure consisting of an outer filler material, intermediate layer material, core material, and inner filler material clad in that order from the outer surface, wherein the core material comprises 0.5–1.6% of Mn, 0.10–0.50% of Cu, 0.05–0.50% of Mg, and 0.06–0.30% of Ti, and, as impurities, 0.5% or less of Fe, 0.5% or less of Si, and 0.1% or less of Zn, with the remainder consisting of Al and unavoidable impurities; the intermediate layer material comprises 0.2–1.5% of Mg and at least one of 0.5–4% of Zn, 0.005–0.2% of In, and 0.01–0.2% of Sn, and, as impurities, 0.3% or less of Si, 0.3% or less Fe, 0.05% or less of Cu, 0.05% or less of Mn, and 0.3% or less of Ti, with the remainder consisting of Al and unavoidable impurities, wherein the thickness of the intermediate layer material is 50 $\mu$m or more and is equal to or less than the thickness of the core material (thickness of the intermediate layer material/thickness of the core material $\leq$1); and the outer filler material and the inner filler material are Al—Si—Mg alloys.

2. In the aluminum alloy brazing sheet according to the above 1, the outer filler material further comprises at least one of 0.005–0.2% of In and 0.01–0.2% of Sn.

3. In the aluminum alloy brazing sheet according to the above 1 or 2, the average grain size of the intermediate layer material is 60 $\mu$m or more.

4. In the aluminum alloy brazing sheet according to any one of the above 1 to 3, the average grain size of the intermediate layer material after heating for brazing is 80 $\mu$m or more.

5. In the aluminum alloy brazing sheet according to any one of the above 1 to 4, the intermediate layer material further comprises Zn, wherein the Zn concentration at the interface between the intermediate layer material and the core material after heating for brazing is 0.1–2.0%, and the Zn concentration in the core material from the center of the plate thickness to the interface between the core material and the filler material is 0.3% or less.

6. In the aluminum alloy brazing sheet according to any one of the above 1 to 5, the ratio of the hardness of the core material to that of the core material in a soft state is 1.15–1.75.

A heat exchanger according to the present invention is fabricated by using the brazing sheet according to any one of the above 1 to 6, wherein the intermediate layer satisfies either the above 4 or the above 4 and 5 over the entire section.

DETAILED DESCRIPTION OF THE INVENTION AND PREFERRED EMBODIMENT

Figure 1:
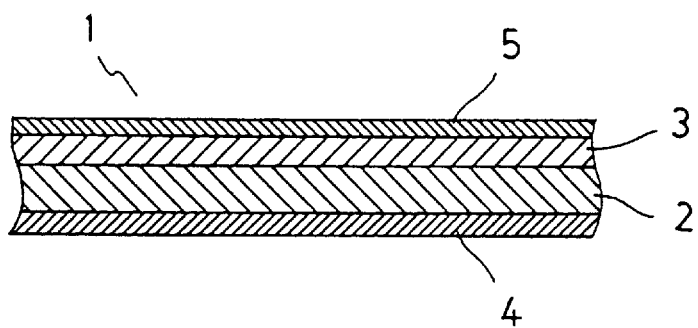
FIG. 1 is a cross section of an aluminum alloy brazing sheet of the present invention.

As shown in FIG. 1, an aluminum alloy brazing sheet 1 for vacuum brazing exhibiting excellent corrosion resistance according to the present invention (hereinafter referred to as "brazing sheet") has a quad-layer structure as an essential structure, which comprises an intermediate layer material 3 positioned on one side of a core material 2, an inner filler material 4 positioned on the other side of the core material 2, and an outer filler material 5 positioned on the intermediate layer material 3. In this quad-layer brazing sheet, the inner filler and outer filler are easily joined when fabricating a heat exchanger, and the intermediate layer material is used to prevent the core material from being corroded.

The meaning of alloy components in the brazing sheet 1, reasons for limitations thereto, and other reasons for limitations will be described below.

(1) Components of Core Material

Si in the core material, which is present as an impurity, forms an AlMnSi compound to improve the strength. The Si content is preferably 0.5% or less. If the Si content exceeds 0.5%, filler Si tends to penetrate along the grain boundary during brazing, thereby decreasing brazability. On the other hand, a highly pure Al metal with an Si content of nearly 0% is impractical due to increased cost. The Si content is still more preferably 0.01–0.5%.

Fe in the core material is present as an impurity in the same manner as Si. The Fe content is preferably 0.5% or less. If the Fe content exceeds 0.5%, the grain of the core material becomes too fine, thereby decreasing erosion resistance of the core material. On the other hand, a highly pure Al metal with an Fe content of nearly 0% is impractical due to increased cost. The Fe content is still more preferably 0.01–0.5%.

Cu improves the strength and corrosion resistance. The Cu content is preferably 0.10–0.50%. If the Cu content is less than 0.10%, the electric potential of the core material becomes less noble than that of the filler, thereby decreasing corrosion resistance. If the Cu content exceeds 0.50%, erosion resistance during brazing and press formability decrease. The Cu content is still more preferably 0.1–0.4%.

Mn is added to improve the strength. The Mn content is preferably 0.5–1.6%. If the Mn content is less than 0.5%, the strength becomes inadequate. If the Mn content exceeds 1.6%, giant compounds are produced during casting, thereby impairing rolling workability.

Mg improves the strength. The Mg content is preferably 0.05–0.50%. If the Mg content is less than 0.05%, the strength becomes inadequate. If the Mg content exceeds 0.50%, intergranular corrosion occurs in the core material, thereby decreasing corrosion resistance. The Mg content is still more preferably 0.1–0.3%.

Ti is added to improve corrosion resistance. The Ti content is preferably 0.06–0.30%. If the Ti content is less than 0.06%, the effect is limited. If the Ti content exceeds 0.30%, giant compounds are produced during casting, thereby impairing rolling workability. The Ti content is still more preferably 0.1–0.25%.

Zn in the core material is present as an impurity in the same manner as Si. The Zn content is preferably 0.1% or less. If the Zn content exceeds 0.1%, the electric potential of the core material becomes less noble and the potential difference between the core material and the intermediate layer material becomes small. As a result, the sacrificial corrosion resistance effect of the intermediate layer material becomes inadequate, thereby decreasing corrosion resistance of the brazing sheet.

(2) Components of Intermediate Layer Material

Si in the intermediate layer material is present as an impurity. The Si content is preferably 0.3% or less. If the Si content exceeds 0.3%, the filler tends to penetrate during brazing, thereby decreasing brazability. On the other hand, a highly pure Al metal with an Si content of nearly 0% is impractical due to increased cost. The Si content is still more preferably 0.01–0.3%.

Although Fe in the intermediate layer material is present as an impurity as in the same manner as Si, the Fe content is limited to improve corrosion resistance. The Fe content is preferably 0.3% or less. If the Fe content exceeds 0.3%, the grain size of the intermediate layer material becomes too fine, whereby Si in the filler penetrates into the grain boundary of the intermediate layer material. This reduces the sacrificial corrosion resistance performance of the intermediate layer material, thereby decreasing corrosion resistance. A highly pure Al metal with an Fe content of nearly 0% is impractical due to increased cost. The Fe content is still more preferably 0.01–0.15%.

Mg improves the strength. The Mg content is preferably 0.2–1.5%. If the Mg content is less than 0.2%, the strength becomes inadequate. If the Mg content exceeds 1.5%, the grain boundary of the intermediate layer material melts during brazing, thereby decreasing brazability.

Zn is added to improve corrosion resistance. The Zn content is preferably 0.5–4.0%. If the Zn content is less than 0.5%, the effect of decreasing the electric potential of the sacrificial anode becomes inadequate, whereby corrosion resistance cannot be obtained. If the Zn content exceeds 4.0%, the grain boundary of the intermediate layer material melts during brazing, thereby decreasing brazability. The Zn content is still more preferably 0.5–3.0%, and particularly preferably 0.5–2.5%.

In is added to improve corrosion resistance. The In content is preferably 0.005–0.2%. If the In content is less than 0.005%, the effect of decreasing the electric potential becomes inadequate, whereby corrosion resistance cannot be obtained. If the In content exceeds 0.2%, the grain boundary of the intermediate layer material melts during brazing, thereby decreasing brazability. The In content is still more preferably 0.01–0.05%.

Sn is added to improve corrosion resistance. The Sn content is preferably 0.01–0.2%. If the Sn content is less than 0.01%, the effect of decreasing the electric potential becomes inadequate, whereby corrosion resistance cannot be obtained. If the Sn content exceeds 0.2%, the grain boundary of the intermediate layer material melts during brazing, thereby decreasing brazability. The Sn content is still more preferably 0.01–0.05%.

Cu in the intermediate layer material is present as an impurity. The Cu content is preferably 0.05% or less. If the Cu content exceeds 0.05%, the electric potential of the intermediate layer material becomes noble, eliminating the potential difference between the intermediate layer material and the core material. As a result, the sacrificial corrosion resistance effect of the intermediate layer material becomes inadequate, thereby decreasing corrosion resistance.

Mn in the intermediate layer material is present as an impurity. The Mn content is preferably 0.05% or less. If the Mn content exceeds 0.05%, since the recrystallization temperature during brazing increases, erosion occurs when heated for brazing, thereby decreasing brazability.

Ti in the intermediate layer material is present as an impurity. The Ti content is preferably 0.3% or less. If the Ti content exceeds 0.3%, giant compounds are produced during casting, thereby impairing rolling workability.

The grain size of the intermediate layer material as a raw material is limited to ensure brazability. The grain size of the intermediate layer material is preferably 60 μm or more. If the grain size is less than 60 μm, the filler penetrates into the grain boundary of the intermediate layer material, whereby brazability tends to decrease.

(3) Components of Brazing Material

As the brazing material, an Al—Si—Mg aluminum alloy comprising 6–13% of Si and 0.5–3.0% of Mg as essential components is used. Moreover, an Al—Si—Mg aluminum alloy further comprising 0.2% or less of Bi and 0.2% or less of Be is also used to improve brazability. As the outer filler material (filler material on the side of intermediate layer material), In and Sn are added to the components of the above filler material.

In improves corrosion resistance. The In content is preferably 0.005–0.2%. If the In content is less than 0.005%, the effect of addition becomes inadequate, whereby corrosion resistance cannot be obtained. If the In content exceeds 0.2%, segregated In exhibits local melting, thereby decreasing rolling workability. The In content is still more preferably 0.01–0.05%. Sn improves corrosion resistance. The Sn content is preferably 0.01–0.2%. If the Sn content is less than 0.01%, the effect of addition becomes inadequate, whereby corrosion resistance cannot be obtained. If the Sn content exceeds 0.2%, segregated In exhibits local melting, thereby decreasing rolling workability. The Sn content is still more preferably 0.01–0.05%.

(4) Thickness of Intermediate Layer Material

The thickness of the intermediate layer material is limited to ensure corrosion resistance. The thickness of the intermediate layer material is preferably 50 μm or more and equal to or less than the thickness of the core material. If the thickness is less than 50 μm, corrosion resistance decreases. If the thickness is greater than the thickness of the core material (thickness of the intermediate layer material/ thickness of the core material>1), clad rolling stability decreases.

(5) Ratio of Micro-Vickers Hardness of Core Material

The ratio of the micro-Vickers hardness of the core material is limited to prevent erosion of the core material and to ensure good formability. The micro-Vickers hardness ratio is preferably 1.15–1.75. If the ratio is less than 1.15, erosion resistance and brazability decrease. If the ratio exceeds 1.75, cracking occurs during press forming.

(6) Average Grain Size of Intermediate Layer Material in Heat Exchanger (After Being Heated for Brazing)

The average grain size of the intermediate layer material is limited to ensure corrosion resistance. The average grain size is preferably 80 μm or more. If the average grain size is less than 80 μm, corrosion resistance decreases.

(7) Zn Concentration at Interface Between Core Material and Intermediate Layer Material (in the Case of Adding Zn to Intermediate Layer Material)

The Zn concentration at the interface between the core material and the intermediate layer material is limited to ensure corrosion resistance. The Zn concentration is preferably 0.1–2.0%. If the Zn concentration is less than 0.1%, the effect of addition of Zn cannot be obtained. If the Zn concentration exceeds 2.0%, the intermediate layer material is consumed so rapidly that the period of time in which the intermediate layer material exhibits the sacrificial corrosion resistance effect becomes short, thereby decreasing corrosion resistance.

(8) Zn Concentration Diffused into Core Material (in the Case of Adding Zn to Intermediate Layer Material)

The diffused Zn concentration, in other words, an average Zn concentration in the core material from the center of the core material to the interface between the brazing material and the core material is limited to ensure corrosion resistance. The average Zn concentration is preferably 0.3% or less. If the concentration exceeds 0.3%, the electric potential of the core material from the center of the core material to the interface between the brazing material and the core material becomes less noble, thereby decreasing corrosion resistance.

The brazing sheet of the present invention is fabricated as follows. Specifically, aluminum alloys constituting the core material, intermediate layer material, and filler material are respectively cast by semi-continuous casting, for example, and are homogenized. The intermediate layer material and the filler material are respectively hot-rolled to a predetermined thickness. These materials and an ingot of the aluminum alloy for the core material are combined and hot-rolled to form a quad-layer clad material with an outer filler material, intermediate layer material, core material, and inner filler material laminated in that order. The quad-layer clad material is prepared to a predetermined thickness by performing cold-rolling, intermediate annealing, and cold-rolling.

Figure 2:
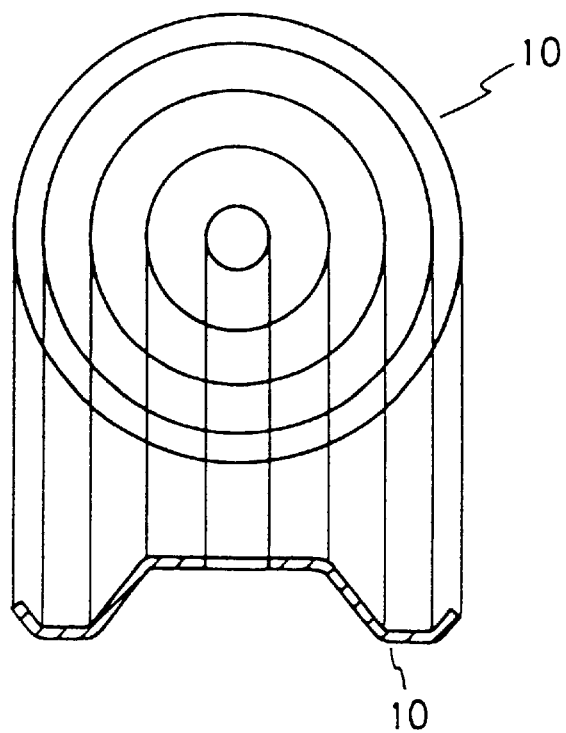
FIG. 2 is a plan view and a cross section of a heat exchanger fabricated by using an aluminum alloy brazing sheet of the present invention.

This brazing sheet 1 is pressed to, for example, a core plate 10 of a drawn-cup type heat exchanger or the like (see FIG. 2). The pressed core plate 10 is laminated with an intermediate layer material 3 being outside. Then, a fin (not shown) made of an aluminum alloy is assembled onto the core plate 10 on the side of the intermediate layer material 3. The assembled body is brazed by vacuum brazing in a brazing furnace to obtain a brazed product 11 of a drawn-cup type heat exchanger such as an evaporator.

EXAMPLES

The present invention will be described in more detail by examples and comparative examples to demonstrate the effect of the present invention. These examples illustrate an embodiment of the present invention and should not be construed as limiting the present invention.

Examples 1–6, 14–29, 42–49, 55–70, 71–82

An aluminum alloy for a core material shown in Table 1 (composition of Examples 1–6), an aluminum alloy for an intermediate layer material shown in Table 2 (composition of Examples 21–36), and an aluminum alloy for a brazing material shown in Table 4 having a composition of a JIS 4104 alloy as an essential component (composition of Examples 51–58) were respectively cast by continuous casting. Each ingot was homogenized and scalped. The intermediate layer material and the brazing material were hot-rolled to a predetermined thickness.

The core materials shown in Table 1, intermediate layer materials shown in Table 2, and filler materials shown in Table 4 were laminated in the order of filler material, core material, intermediate layer material, and filler material. The combinations of each material in Example 1–6, Example 14–29, and Example 42–49 are respectively shown in Table 5, Table 7, and Table 11. Moreover, each material was laminated in the order of filler material, core material, intermediate layer material, and filler material in Example 55–70 (Table 13) and Examples 71–82 (Table 15), while changing the clad ratio of the intermediate layer material to the core material (intermediate layer ratio). The laminated materials were rolled by hot clad rolling at 480° C. to obtain clad materials (brazing sheets) with a thickness of 3 mm. The clad materials were then cold-rolled and provided with final annealing at 350–450° C. to obtain brazing sheets with a thickness of 0.5 mm. The thickness of the filler material was 0.08 mm (80 μm) for both the core material side and the intermediate layer material side.

Figure 3:
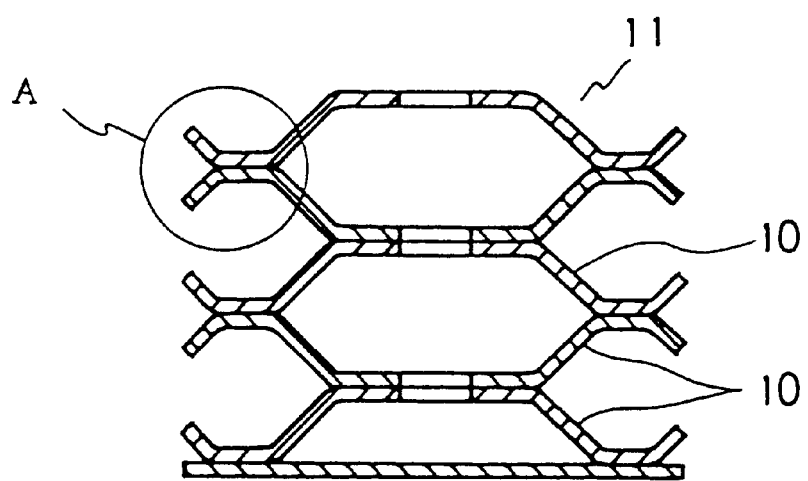
FIG. 3 is a cross section showing a heat exchanger fabricated by using an aluminum alloy brazing sheet of the present invention.
Figure 4:
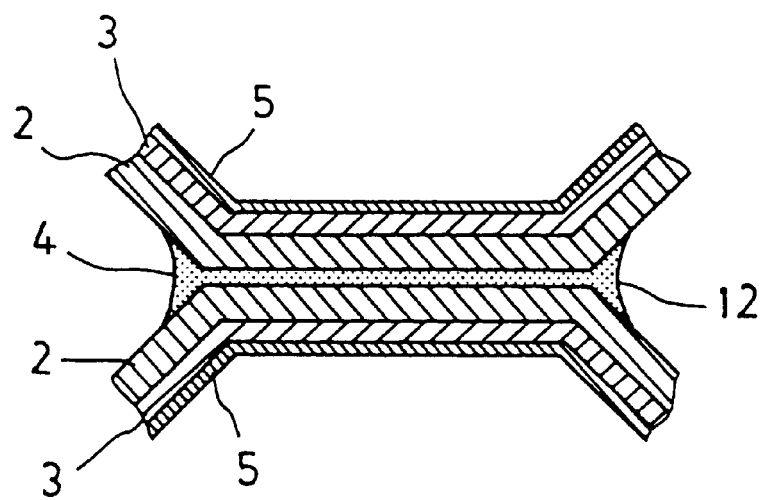
FIG. 4 is a cross section of a portion A in FIG. 3.

A circular plate was cut from each brazing sheet and press-formed so that the side of the intermediate layer material 3 was convex, as shown in FIG. 2. The resulting cup-like core plates (press-formed product) 10 were alternately laminated as shown in FIG. 3 and brazed with vacuum brazing under the conditions of degree of vacuum of $5 \times 10^{-5}$ Torr or less, temperature of 600° C., and retention time of 3 minutes, to obtain a brazed product 11. FIG. 4 shows a brazed part 12 of the brazed product 11.

Performances of the brazing sheets were evaluated according to the following methods.
(1) Rolling and Hot Rolling Characteristics In the fabrication of the core materials in Examples 1–6 in Table 1, intermediate layer materials in Examples 21–36 in Table 2, and filler materials in Examples 51–58 in Table 4, a material which could be rolled was indicated by ◯ and a material which could not be rolled was indicated by X.

In the fabrication of each brazing sheet in Examples 1–6 in Table 5, Examples 14–29 in Table 7, Examples 42–49 in Table 11, and Examples 55–70 in Table 13, a brazing sheet which could be hot-rolled was indicated by ◯ and a brazing sheet which could not be hot-rolled was indicated by X.
(2) Fabrication Stability A brazing sheet for which stable mass production was possible was indicated by ◯, and a brazing sheet for which stable mass production was impossible due to the uneven clad rate was indicated by X.
(3) Thickness of Intermediate Layer Material and Its Ratio A brazing sheet in which the thickness of the intermediate layer material was 50 μm or more and the ratio of the thickness of the intermediate layer material to the thickness of the core material was 1 or less was determined to be acceptable.
(4) Grain size of Intermediate Layer Material (Raw Material)

The grain size of the intermediate layer material of each brazing sheet before brazing was measured by polarization structural investigation. A brazing sheet in which the grain size was less than 60 μm was determined to be unacceptable.
(5) Grain Size of Intermediate Layer Material (After Vacuum Brazing)

Each brazing sheet before performing press-forming was heated for vacuum brazing. The grain size of the intermediate layer material after brazing was measured by polarization structural investigation. A brazing sheet in which the grain size was less than 80 μm was determined to be unacceptable.
(6) Hardness Ratio For each brazing sheet, a brazing sheet in which the ratio of the micro-Vickers hardness of the core material in a raw material state to that of the core material in a fully-annealed state was more than 1.00 and less than 1.15, or more than 1.75 was determined to be unacceptable.
(7) Press Formability A brazing sheet in which cracking did not occur during press forming was indicated by ◯, and a brazing sheet in which cracking occurred was indicated by X.
(8) Brazability The sectional structure of brazed products of each brazing sheet was observed using a microscope to examine the erosion by the filler. A brazing sheet in which the maximum erosion depth of the core material was less than 50 μm was indicated by ⊚, 50–100 μm indicated by ◯, and more than 100 μm indicated by X.
(9) Tensile Strength After Vacuum Brazing A brazing sheet of which the tensile strength after vacuum brazing was 110 MPa or less was determined to be unacceptable.
(10) Zn Concentration at Interface Between Core Material and Intermediate Layer Material A brazing sheet of which the Zn concentration at the interface of the core material was 0.5–2.0% was determined to be acceptable.
(11) Average Zn Concentration in Core Material The Zn distribution in the core material of each brazing sheet was examined by electron probe microanalysis (EPMA) in the direction of the plate thickness to measure the average Zn concentration. A brazing sheet in which the average Zn concentration in the core material was 0.3% or less was determined as acceptable.
(12) Corrosion Resistance A spray-dry cycle corrosion test simulating drain water in an actual environment was conducted for each brazed product. As a corrosive solution, an aqueous solution containing 10 ppm of Cl⁻ and 200 ppm of $SO_4^{2-}$ was used. This corrosive solution was sprayed onto the brazed product at 50° C. for 6 hours and the brazed product was then dried at 50° C. for 6 hours. The spraying conditions were according to a salt spray test (JIS Z2371) except for the composition of the corrosive solution. Occurrence of leakage (perforation) was observed with a maximum test time of 3000 hours. Corrosion resistance of each brazed product was evaluated as follows.

A brazed product exhibiting no perforation within 3000 hours of testing was determined to have excellent corrosion resistance and indicated by ⊚.

A brazed product exhibiting perforations from 2500 to 3000 hours of testing was determined to have good corrosion resistance and indicated by ◯.

A brazed product exhibiting perforations before 2500 hours of testing was determined to have poor corrosion resistance and indicated by X.

Comparative Examples 7–13, 30–41, 50–54, 83–84

An aluminum alloy for a core material shown in Table 1 (composition of Comparative Examples 7–13), an aluminum alloy for an intermediate layer material shown in Table 3 (composition of Comparative Examples 37–47), and an aluminum alloy for a brazing material shown in Table 4 having a composition of a JIS 4104 alloy as an essential component (composition of Comparative Examples 59–63) were respectively cast by continuous casting and treated in the same manner as in the above Examples.

These materials were laminated in the combinations shown in Comparative Examples 7–13 in Table 5, Comparative Examples 30–41 in Table 9, and Comparative Examples 50–54 in Table 11 in the order of filler material, core material, intermediate layer material, and filler material. Moreover, each material was laminated in the order of filler material, core material, intermediate layer material, and filler material while changing a clad ratio of the intermediate layer material to the core material (intermediate layer ratio) in Comparative Examples 83 and 84 in Table 15.

These laminated materials were processed into clad materials (brazing sheets) in the same manner as in the above Examples. Each brazing sheet was fabricated into a brazed product.

In the same manner as in the above Examples, (1) rolling and hot rolling characteristics, (2) fabrication stability, (3) thickness of the intermediate layer material and its ratio, (4) grain size of intermediate layer material (raw material), (5) grain size of intermediate layer material (after vacuum brazing), (6) hardness ratio, (7) press formability, (8) brazability, (9) tensile strength after vacuum brazing, (10) Zn concentration at interface between core material and intermediate layer material, (11) average Zn concentration in core material, and (12) corrosion resistance were evaluated.

The results of the evaluations in the Examples and Comparative Examples are shown in Tables 1–16.

TABLE 1

|  | Material No | Si | Fe | Cu | Mn | Mg | Zn | Ti | Rolling characteristics |
|---|---|---|---|---|---|---|---|---|---|
| Example | 1 | 0.41 | 0.11 | 0.11 | 0.54 | 0.22 | 0.01 | 0.11 | ○ |
|  | 2 | 0.08 | 0.42 | 0.47 | 1.56 | 0.29 | 0.06 | 0.24 | ○ |
|  | 3 | 0.21 | 0.24 | 0.38 | 1.09 | 0.12 | 0.02 | 0.06 | ○ |
|  | 4 | 0.09 | 0.12 | 0.11 | 0.72 | 0.46 | 0.02 | 0.29 | ○ |
|  | 5 | 0.08 | 0.14 | 0.33 | 0.82 | 0.26 | 0.02 | 0.19 | ○ |
|  | 6 | 0.09 | 0.11 | 0.42 | 0.77 | 0.17 | 0.01 | 0.21 | ○ |
| Comparative Example | 7 | 0.61 | 0.41 | 0.03 | 0.35 | 0.09 | 0.09 | 0.07 | ○ |
|  | 8 | 0.36 | 0.62 | 0.11 | 0.55 | 0.08 | 0.19 | 0.11 | ○ |
|  | 9 | 0.47 | 0.43 | 0.64 | 1.58 | 0.47 | 0.04 | 0.26 | ○ |
|  | 10 | 0.33 | 0.39 | 0.46 | 1.76 | 0.28 | 0.06 | 0.19 | × |
|  | 11 | 0.09 | 0.11 | 0.13 | 0.67 | 0.02 | 0.07 | 0.02 | ○ |
|  | 12 | 0.22 | 0.24 | 0.11 | 1.11 | 0.67 | 0.08 | 0.09 | ○ |
|  | 13 | 0.21 | 0.26 | 0.38 | 1.41 | 0.26 | 0.03 | 0.41 | × |

TABLE 2

|  | Material No | Si | Fe | Cu | Mn | Mg | Ti | Zn | In | Sn | Rolling characteristics |
|---|---|---|---|---|---|---|---|---|---|---|---|
| Example | 21 | 0.22 | 0.27 | 0.02 | 0.01 | 0.23 | 0.02 | — | 0.03 | — | ○ |
|  | 22 | 0.09 | 0.06 | 0.04 | 0.03 | 0.79 | 0.11 | 2.63 | — | — | ○ |
|  | 23 | 0.13 | 0.19 | 0.01 | 0.01 | 1.45 | 0.24 | — | — | 0.02 | ○ |
|  | 24 | 0.12 | 0.29 | 0.01 | 0.04 | 0.51 | 0.03 | 0.59 | — | — | ○ |
|  | 25 | 0.19 | 0.07 | 0.04 | 0.01 | 0.73 | 0.19 | 3.69 | — | — | ○ |
|  | 26 | 0.21 | 0.16 | 0.01 | 0.03 | 1.07 | 0.18 | — | 0.01 | — | ○ |
|  | 27 | 0.07 | 0.23 | 0.02 | 0.03 | 1.22 | 0.16 | — | 0.17 | — | ○ |
|  | 28 | 0.27 | 0.24 | 0.02 | 0.02 | 0.33 | 0.27 | — | — | 0.02 | ○ |
|  | 29 | 0.28 | 0.18 | 0.03 | 0.02 | 1.46 | 0.06 | — | — | 0.18 | ○ |
|  | 30 | 0.08 | 0.09 | 0.01 | 0.01 | 0.67 | 0.03 | 1.98 | — | — | ○ |
|  | 31 | 0.09 | 0.08 | 0.01 | 0.02 | 0.73 | 0.02 | — | 0.03 | — | ○ |
|  | 32 | 0.11 | 0.11 | 0.01 | 0.01 | 0.81 | 0.01 | — | — | 0.04 | ○ |
|  | 33 | 0.09 | 0.08 | 0.01 | 0.01 | 0.81 | 0.01 | 1.76 | 0.02 | — | ○ |
|  | 34 | 0.07 | 0.06 | 0.01 | 0.02 | 0.62 | 0.02 | 1.56 | — | 0.03 | ○ |
|  | 35 | 0.07 | 0.05 | 0.01 | 0.03 | 0.76 | 0.03 | — | 0.03 | 0.03 | ○ |
|  | 36 | 0.08 | 0.12 | 0.01 | 0.02 | 0.67 | 0.02 | 1.44 | 0.02 | 0.02 | ○ |

TABLE 3

|  | Material No | Si | Fe | Cu | Mn | Mg | Ti | Zn | In | Sn | Rolling characteristics |
|---|---|---|---|---|---|---|---|---|---|---|---|
| Comparative Example | 37 | 0.41 | 0.33 | 0.04 | 0.04 | 0.08 | 0.01 | 3.33 | — | — | ○ |
|  | 38 | 0.26 | 0.27 | 0.12 | 0.16 | 1.09 | 0.11 | — | 0.03 | — | ○ |
|  | 39 | 0.23 | 0.24 | 0.03 | 0.03 | 1.69 | 0.22 | — | — | 0.04 | ○ |
|  | 40 | 0.16 | 0.19 | 0.01 | 0.02 | 1.44 | 0.47 | 4.11 | 0.02 | 0.03 | × |
|  | 41 | 0.13 | 0.18 | 0.04 | 0.01 | 0.18 | 0.01 | 0.27 | — | — | ○ |

TABLE 3-continued

| Material No | Component (mass %) | | | | | | | | | Rolling characteristics |
|---|---|---|---|---|---|---|---|---|---|---|
| | Si | Fe | Cu | Mn | Mg | Ti | Zn | In | Sn | |
| 42 | 0.19 | 0.06 | 0.04 | 0.03 | 1.22 | 0.17 | 5.11 | — | — | ○ |
| 43 | 0.15 | 0.23 | 0.03 | 0.05 | 0.47 | 0.09 | — | 0.002 | — | ○ |
| 44 | 0.22 | 0.25 | 0.05 | 0.04 | 1.35 | 0.06 | — | 0.31 | — | × |
| 45 | 0.27 | 0.17 | 0.01 | 0.01 | 0.39 | 0.10 | — | — | 0.005 | ○ |
| 46 | 0.18 | 0.26 | 0.02 | 0.02 | 1.48 | 0.13 | — | — | 0.33 | × |
| 47 | 0.14 | 0.22 | 0.04 | 0.04 | 0.55 | 0.04 | 0.22 | 0.002 | 0.005 | ○ |

TABLE 4

| | Material No | Component (mass %) | | | | | | | | | Rolling characteristics |
|---|---|---|---|---|---|---|---|---|---|---|---|
| | | Si | Fe | Cu | Mn | Mg | Ti | Bi | In | Sn | |
| Example | 51 | 10.1 | 0.31 | 0.01 | 0.05 | 1.51 | 0.01 | 0.11 | — | — | ○ |
| | 52 | 10.2 | 0.24 | 0.02 | 0.03 | 1.33 | 0.02 | 0.09 | 0.01 | — | ○ |
| | 53 | 10.1 | 0.06 | 0.02 | 0.04 | 1.21 | 0.01 | 0.08 | 0.17 | — | ○ |
| | 54 | 10.3 | 0.28 | 0.01 | 0.01 | 1.26 | 0.01 | 0.13 | — | 0.02 | ○ |
| | 55 | 10.3 | 0.09 | 0.01 | 0.01 | 1.42 | 0.03 | 0.12 | — | 0.18 | ○ |
| | 56 | 10.2 | 0.22 | 0.01 | 0.02 | 1.47 | 0.02 | 0.11 | 0.03 | — | ○ |
| | 57 | 10.1 | 0.21 | 0.03 | 0.05 | 1.14 | 0.02 | 0.07 | — | 0.04 | ○ |
| | 58 | 10.2 | 0.13 | 0.03 | 0.04 | 1.19 | 0.02 | 0.14 | 0.03 | 0.04 | ○ |
| Comparative Example | 59 | 10.3 | 0.28 | 0.02 | 0.01 | 1.33 | 0.01 | 0.11 | 0.002 | — | ○ |
| | 60 | 10.3 | 0.09 | 0.01 | 0.01 | 1.23 | 0.03 | 0.09 | 0.31 | — | × |
| | 61 | 10.2 | 0.22 | 0.01 | 0.02 | 1.16 | 0.02 | 0.08 | — | 0.005 | ○ |
| | 62 | 10.1 | 0.04 | 0.01 | 0.05 | 1.28 | 0.02 | 0.13 | — | 0.33 | × |
| | 63 | 10.2 | 0.13 | 0.03 | 0.04 | 1.19 | 0.02 | 0.12 | 0.002 | 0.005 | ○ |

TABLE 5

| | | Filler material 80 μm | Core material 260 μm | Intermediate layer material 80 μm | Filler material 80 μm | Ratio of intermediate layer material | Grain size of intermediate layer material μm | |
|---|---|---|---|---|---|---|---|---|
| | | | | | | | Raw material | After vacuum brazing |
| Example | 1 | 51 | 1 | 32 | 57 | 0.31 | 146 | 194 |
| | 2 | 51 | 2 | 30 | 58 | 0.31 | 155 | 206 |
| | 3 | 51 | 3 | 31 | 51 | 0.31 | 159 | 212 |
| | 4 | 51 | 4 | 32 | 56 | 0.31 | 146 | 194 |
| | 5 | 51 | 5 | 30 | 51 | 0.31 | 155 | 206 |
| | 6 | 51 | 6 | 31 | 56 | 0.31 | 159 | 212 |
| Comparative Example | 7 | 51 | 7 | 32 | 57 | 0.31 | 146 | 194 |
| | 8 | 51 | 8 | 30 | 58 | 0.31 | 155 | 206 |
| | 9 | 51 | 9 | 31 | 51 | 0.31 | 159 | 212 |
| | 10 | 51 | 10 | 32 | 56 | 0.31 | — | — |
| | 11 | 51 | 11 | 21 | 57 | 0.31 | 74 | 98 |
| | 12 | 51 | 12 | 31 | 58 | 0.31 | 159 | 212 |
| | 13 | 51 | 13 | 32 | 51 | 0.31 | — | — |

TABLE 6

| | | Hot rolling characteristics | Fabrication stability | Hardness ratio | Press formability | Brazability | Tensile strength after vacuum brazing | Zn concentration at interface | Average Zn concentration | Corrosion resistance |
|---|---|---|---|---|---|---|---|---|---|---|
| Example | 1 | ○ | ○ | 1 | ○ | ○ | 121 | — | — | ◎ |
| | 2 | ○ | ○ | 1 | ○ | ○ | 159 | 0.92 | 0.009 | ◎ |
| | 3 | ○ | ○ | 1 | ○ | ○ | 141 | — | — | ○ |
| | 4 | ○ | ○ | 1 | ○ | ○ | 141 | — | — | ◎ |
| | 5 | ○ | ○ | 1 | ○ | ○ | 139 | 0.92 | 0.009 | ○ |
| | 6 | ○ | ○ | 1 | ○ | ○ | 142 | — | — | ◎ |
| Comparative Example | 7 | ○ | ○ | 1 | ○ | × | 109 | — | — | × |
| | 8 | ○ | ○ | 1 | ○ | × | 113 | 0.92 | 0.009 | × |
| | 9 | ○ | ○ | 1 | × | — | 183 | — | — | — |
| | 10 | × | — | — | — | — | — | — | — | — |
| | 11 | ○ | ○ | 1 | ○ | ○ | 110 | — | — | × |

TABLE 6-continued

| | | Hot rolling characteristics | Fabrication stability | Hardness ratio | Press formability | Brazability | Tensile strength after vacuum brazing | Zn concentration at interface | Average Zn concentration | Corrosion resistance |
|---|---|---|---|---|---|---|---|---|---|---|
| | 12 | ○ | ○ | 1 | ○ | ○ | 159 | — | — | × |
| | 13 | × | — | — | — | — | — | — | — | — |

TABLE 7

| | | Filler material 80 μm | Core material 260 μm | Intermediate layer material 80 μm | Filler material 80 μm | Ratio of intermediate layer material | Grain size of intermediate layer material μm | |
|---|---|---|---|---|---|---|---|---|
| | | | | | | | Raw material | After vacuum brazing |
| Example | 14 | 51 | 5 | 21 | 56 | 0.31 | 74 | 98 |
| | 15 | 51 | 6 | 22 | 57 | 0.31 | 168 | 224 |
| | 16 | 51 | 5 | 23 | 58 | 0.31 | 110 | 146 |
| | 17 | 51 | 6 | 24 | 51 | 0.31 | 5 | 86 |
| | 18 | 51 | 5 | 25 | 56 | 0.31 | 164 | 218 |
| | 19 | 51 | 6 | 26 | 57 | 0.31 | 123 | 164 |
| | 20 | 51 | 5 | 27 | 58 | 0.31 | 92 | 122 |
| | 21 | 51 | 6 | 28 | 51 | 0.31 | 87 | 116 |
| | 22 | 51 | 5 | 29 | 56 | 0.31 | 114 | 152 |
| | 23 | 51 | 6 | 30 | 57 | 0.31 | 155 | 206 |
| | 24 | 51 | 5 | 31 | 58 | 0.31 | 159 | 212 |
| | 25 | 51 | 6 | 32 | 51 | 0.31 | 146 | 194 |
| | 26 | 51 | 5 | 33 | 56 | 0.31 | 155 | 206 |
| | 27 | 51 | 6 | 34 | 57 | 0.31 | 168 | 224 |
| | 28 | 51 | 5 | 35 | 58 | 0.31 | 173 | 230 |
| | 29 | 51 | 6 | 36 | 51 | 0.31 | 141 | 188 |

TABLE 8

| | | Hot rolling characteristics | Fabrication stability | Hardness ratio | Press formability | Brazability | Tensile strength after vacuum brazing | Zn concentration at interface | Average Zn concentration | Corrosion resistance |
|---|---|---|---|---|---|---|---|---|---|---|
| Example | 14 | ○ | ○ | 1 | ○ | ○ | 129 | — | — | ◎ |
| | 15 | ○ | ○ | 1 | ○ | ○ | 141 | 1.29 | 0.013 | ◎ |
| | 16 | ○ | ○ | 1 | ○ | ○ | 157 | — | — | ◎ |
| | 17 | ○ | ○ | 1 | ○ | ○ | 135 | 0.17 | 0.002 | ○ |
| | 18 | ○ | ○ | 1 | ○ | ○ | 144 | 1.78 | 0.018 | ◎ |
| | 19 | ○ | ○ | 1 | ○ | ○ | 147 | — | — | ◎ |
| | 20 | ○ | ○ | 1 | ○ | ○ | 152 | — | — | ◎ |
| | 21 | ○ | ○ | 1 | ○ | ○ | 131 | — | — | ○ |
| | 22 | ○ | ○ | 1 | ○ | ○ | 157 | — | — | ◎ |
| | 23 | ○ | ○ | 1 | ○ | ○ | 138 | 0.92 | 0.009 | ◎ |
| | 24 | ○ | ○ | 1 | ○ | ○ | 143 | — | — | ◎ |
| | 25 | ○ | ○ | 1 | ○ | ○ | 141 | — | — | ○ |
| | 26 | ○ | ○ | 1 | ○ | ○ | 139 | 0.83 | 0.009 | ◎ |
| | 27 | ○ | ○ | 1 | ○ | ○ | 137 | 0.77 | 0.008 | ◎ |
| | 28 | ○ | ○ | 1 | ○ | ○ | 142 | — | — | ◎ |
| | 29 | ○ | ○ | 1 | ○ | ○ | 138 | 0.63 | 0.006 | ○ |

TABLE 9

| | | Filler material 80 μm | Core material 260 μm | Intermediate layer material 80 μm | Filler material 80 μm | Ratio of intermediate layer material | Grain size of intermediate layer material μm | |
|---|---|---|---|---|---|---|---|---|
| | | | | | | | Raw material | After vacuum brazing |
| Comparative Example | 30 | 51 | 1 | 37 | 56 | 0.31 | 47 | 62 |
| | 31 | 51 | 6 | 38 | 57 | 0.31 | 74 | 98 |
| | 32 | 51 | 5 | 39 | 58 | 0.31 | 87 | 116 |
| | 33 | 51 | 6 | 40 | 51 | 0.31 | — | — |
| | 34 | 51 | 5 | 41 | 56 | 0.31 | 114 | 152 |
| | 35 | 51 | 6 | 42 | 57 | 0.31 | 168 | 224 |
| | 36 | 51 | 5 | 43 | 58 | 0.31 | 92 | 122 |
| | 37 | 51 | 6 | 44 | 51 | 0.31 | — | — |
| | 38 | 51 | 5 | 45 | 56 | 0.31 | 119 | 158 |

TABLE 9-continued

| | | Filler material 80 μm | Core material 260 μm | Intermediate layer material 80 μm | Filler material 80 μm | Ratio of intermediate layer material | Grain size of intermediate layer material μm Raw material | After vacuum brazing |
|---|---|---|---|---|---|---|---|---|
| | 39 | 51 | 6 | 46 | 57 | 0.31 | — | — |
| | 40 | 51 | 5 | 47 | 58 | 0.31 | 96 | 128 |
| | 41 | 51 | 5 | 25 | 56 | 1.00 | 164 | 218 |

TABLE 10

| | | Hot rolling characteristics | Fabrication stability | Hardness ratio | Press formability | Brazability | Tensile strength after vacuum brazing | Zn concentration at interface | Average Zn concentration | Corrosion resistance |
|---|---|---|---|---|---|---|---|---|---|---|
| Comparative Example | 30 | ○ | ○ | 1 | ○ | × | 105 | 0.84 | 0.09 | × |
| | 31 | ○ | ○ | 1 | ○ | × | 150 | — | — | × |
| | 32 | ○ | ○ | 1 | ○ | × | 164 | — | — | × |
| | 33 | × | — | — | — | — | — | — | — | — |
| | 34 | ○ | ○ | 1 | ○ | ○ | 143 | 0.10 | 0.001 | × |
| | 35 | ○ | ○ | 1 | ○ | × | 152 | 2.51 | 0.026 | × |
| | 36 | ○ | ○ | 1 | ○ | ○ | 135 | — | — | × |
| | 37 | × | — | — | — | — | — | — | — | — |
| | 38 | ○ | ○ | 1 | ○ | ○ | 133 | — | — | × |
| | 39 | × | — | — | — | — | — | — | — | — |
| | 40 | ○ | ○ | 1 | ○ | ○ | 137 | 0.08 | 0.001 | × |
| | 41 | ○ | ○ | 1 | ○ | ○ | 156 | 1.78 | 0.31 | × |

TABLE 11

| | | Filler material 80 μm | Core material 260 μm | Intermediate layer material 80 μm | Filler material 80 μm | Ratio of intermediate layer material | Grain size of intermediate layer material μm Raw material | After vacuum brazing |
|---|---|---|---|---|---|---|---|---|
| Example | 42 | 51 | 6 | 30 | 56 | 0.31 | 155 | 206 |
| | 43 | 51 | 5 | 31 | 52 | 0.31 | 159 | 212 |
| | 44 | 51 | 6 | 32 | 53 | 0.31 | 146 | 194 |
| | 45 | 51 | 5 | 30 | 54 | 0.31 | 155 | 206 |
| | 46 | 51 | 6 | 31 | 55 | 0.31 | 159 | 212 |
| | 47 | 51 | 5 | 32 | 51 | 0.31 | 146 | 194 |
| | 48 | 51 | 6 | 30 | 57 | 0.31 | 155 | 206 |
| | 49 | 51 | 5 | 31 | 58 | 0.31 | 159 | 212 |
| Comparative Example | 50 | 51 | 6 | 32 | 59 | 0.31 | 146 | 194 |
| | 51 | 51 | 5 | 30 | 60 | 0.31 | — | — |
| | 52 | 51 | 6 | 31 | 61 | 0.31 | 159 | 212 |
| | 53 | 51 | 5 | 32 | 62 | 0.31 | — | — |
| | 54 | 51 | 6 | 30 | 63 | 0.31 | 155 | 206 |

TABLE 12

| | | Hot rolling characteristics | Fabrication stability | Hardness ratio | Press formability | Brazability | Tensile strength after vacuum brazing | Zn concentration at interface | Average Zn concentration | Corrosion resistance |
|---|---|---|---|---|---|---|---|---|---|---|
| Example | 42 | ○ | ○ | 1 | ○ | ○ | 138 | 0.92 | 0.009 | ⊚ |
| | 43 | ○ | ○ | 1 | ○ | ○ | 143 | — | — | ⊚ |
| | 44 | ○ | ○ | 1 | ○ | ○ | 141 | — | — | ⊚ |
| | 45 | ○ | ○ | 1 | ○ | ○ | 139 | 0.92 | 0.009 | ⊚ |
| | 46 | ○ | ○ | 1 | ○ | ○ | 142 | — | — | ⊚ |
| | 47 | ○ | ○ | 1 | ○ | ○ | 142 | — | — | ○ |
| | 48 | ○ | ○ | 1 | ○ | ○ | 138 | 0.92 | 0.009 | ⊚ |
| | 49 | ○ | ○ | 1 | ○ | ○ | 143 | — | — | ⊚ |
| Comparative Example | 50 | ○ | ○ | 1 | ○ | ○ | 141 | — | — | ○ |
| | 51 | × | — | — | — | — | — | — | — | — |
| | 52 | ○ | ○ | 1 | ○ | ○ | 142 | — | — | ○ |
| | 53 | × | — | — | — | — | — | — | — | — |
| | 54 | ○ | ○ | 1 | ○ | ○ | 138 | 0.92 | 0.009 | ○ |

TABLE 13

| | | Filler material 80 μm | Core material 260 μm | Intermediate layer material 80 μm | Filler material 80 μm | Ratio of intermediate layer material | Grain size of intermediate layer material μm | |
|---|---|---|---|---|---|---|---|---|
| | | | | | | | Material | After vacuum brazing |
| Example | 55 | 51 | 5 | 30 (165) | 51 | 0.94 | 155 | 206 |
| | 56 | 51 | 6 | 30 (54) | 56 | 0.19 | 155 | 206 |
| | 57 | 51 | 5 | 30 (82) | 57 | 0.32 | 155 | 206 |
| | 58 | 51 | 6 | 30 (123) | 58 | 0.57 | 155 | 206 |
| | 59 | 51 | 5 | 31 (149) | 51 | 0.78 | 159 | 212 |
| | 60 | 51 | 6 | 31 (78) | 56 | 0.30 | 159 | 212 |
| | 61 | 51 | 5 | 31 (104) | 57 | 0.44 | 159 | 212 |
| | 62 | 51 | 6 | 31 (136) | 58 | 0.67 | 159 | 212 |
| | 63 | 51 | 5 | 32 (145) | 51 | 0.74 | 146 | 194 |
| | 64 | 51 | 6 | 32 (74) | 56 | 0.28 | 146 | 194 |
| | 65 | 51 | 5 | 32 (109) | 57 | 0.47 | 146 | 194 |
| | 66 | 51 | 6 | 32 (116) | 58 | 0.52 | 146 | 194 |
| | 67 | 51 | 5 | 33 (161) | 51 | 0.90 | 155 | 206 |
| | 68 | 51 | 6 | 33 (64) | 56 | 0.23 | 155 | 206 |
| | 69 | 51 | 5 | 33 (99) | 57 | 0.41 | 155 | 206 |
| | 70 | 51 | 6 | 33 (133) | 58 | 0.64 | 155 | 206 |

TABLE 14

| | | Hot rolling characteristics | Fabrication stability | Hardness ratio | Press formability | Braza-bility | Tensile strength after vacuum brazing | Zn concentration at interface | Average Zn concentration | Corrosion resistance |
|---|---|---|---|---|---|---|---|---|---|---|
| Example | 55 | ○ | ○ | 1 | ○ | ○ | 146 | 1.9 | 0.28 | ◉ |
| | 56 | ○ | ○ | 1 | ○ | ○ | 136 | 0.6 | 0.01 | ○ |
| | 57 | ○ | ○ | 1 | ○ | ○ | 139 | 1.0 | 0.03 | ◉ |
| | 58 | ○ | ○ | 1 | ○ | ○ | 142 | 1.43 | 0.09 | ◉ |
| | 59 | ○ | ○ | 1 | ○ | ○ | 152 | — | — | ○ |
| | 60 | ○ | ○ | 1 | ○ | ○ | 142 | — | — | ◉ |
| | 61 | ○ | ○ | 1 | ○ | ○ | 146 | — | — | ◉ |
| | 62 | ○ | ○ | 1 | ○ | ○ | 150 | — | — | ◉ |
| | 63 | ○ | ○ | 1 | ○ | ○ | 150 | — | — | ○ |
| | 64 | ○ | ○ | 1 | ○ | ○ | 141 | — | — | ○ |
| | 65 | ○ | ○ | 1 | ○ | ○ | 146 | — | — | ◉ |
| | 66 | ○ | ○ | 1 | ○ | ○ | 146 | — | — | ◉ |
| | 67 | ○ | ○ | 1 | ○ | ○ | 152 | 1.7 | 0.25 | ○ |
| | 68 | ○ | ○ | 1 | ○ | ○ | 139 | 0.7 | 0.01 | ○ |
| | 69 | ○ | ○ | 1 | ○ | ○ | 145 | 1.0 | 0.05 | ◉ |
| | 70 | ○ | ○ | 1 | ○ | ○ | 148 | 1.4 | 0.11 | ◉ |

TABLE 15

| | | Filler material 80 μm | Core material 260 μm | Intermediate layer material (Thickeness of Intermediate layer material μm) | Filler material 80 μm | Ratio of intermediate layer material | Grain size of intermediate layer material μm | |
|---|---|---|---|---|---|---|---|---|
| | | | | | | | Raw material | After vacuum brazing |
| Example | 71 | 51 | 5 | 34 (157) | 51 | 0.86 | 168 | 224 |
| | 72 | 51 | 6 | 34 (59) | 56 | 0.21 | 168 | 224 |
| | 73 | 51 | 5 | 34 (95) | 57 | 0.39 | 168 | 224 |
| | 74 | 51 | 6 | 34 (129) | 58 | 0.61 | 168 | 224 |
| | 75 | 51 | 5 | 35 (141) | 51 | 0.71 | 173 | 230 |
| | 76 | 51 | 6 | 35 (74) | 56 | 0.26 | 173 | 230 |
| | 77 | 51 | 5 | 35 (92) | 57 | 0.37 | 173 | 230 |
| | 78 | 51 | 6 | 35 (121) | 58 | 0.55 | 173 | 230 |
| | 79 | 51 | 5 | 36 (153) | 51 | 0.82 | 141 | 188 |
| | 80 | 51 | 6 | 36 (68) | 56 | 0.25 | 141 | 188 |
| | 81 | 51 | 5 | 35 (86) | 57 | 0.34 | 141 | 188 |
| | 82 | 51 | 6 | 36 (112) | 58 | 0.49 | 141 | 188 |
| Comparative Example | 83 | 51 | 6 | 35 (47) | 58 | 0.16 | 173 | 230 |
| | 84 | 51 | 6 | 35 (190) | 58 | 1.27 | — | — |

TABLE 16

|  |  | Hot rolling characteristics | Fabrication stability | Hardness ratio | Press moldability | Braza- bility | Tensile strength after vacuum brazing | Zn concentra- tion at interface | Average Zn concentration | Corrosion resistance |
|---|---|---|---|---|---|---|---|---|---|---|
| Example | 71 | ○ | ○ | 1 | ○ | ○ | 143 | 1.5 | 0.21 | ⊚ |
|  | 72 | ○ | ○ | 1 | ○ | ○ | 135 | 0.6 | 0.01 | ○ |
|  | 73 | ○ | ○ | 1 | ○ | ○ | 139 | 0.9 | 0.04 | ⊚ |
|  | 74 | ○ | ○ | 1 | ○ | ○ | 140 | 1.2 | 0.09 | ⊚ |
|  | 75 | ○ | ○ | 1 | ○ | ○ | 150 | — | — | ⊚ |
|  | 76 | ○ | ○ | 1 | ○ | ○ | 140 | — | — | ○ |
|  | 77 | ○ | ○ | 1 | ○ | ○ | 144 | — | — | ⊚ |
|  | 78 | ○ | ○ | 1 | ○ | ○ | 146 | — | — | ⊚ |
|  | 79 | ○ | ○ | 1 | ○ | ○ | 150 | 1.2 | 0.14 | ⊚ |
|  | 80 | ○ | ○ | 1 | ○ | ○ | 138 | 0.5 | 0.06 | ○ |
|  | 81 | ○ | ○ | 1 | ○ | ○ | 139 | 0.7 | 0.02 | ⊚ |
|  | 82 | ○ | ○ | 1 | ○ | ○ | 142 | 0.9 | 0.02 | ⊚ |
| Comparative | 83 | ○ | ○ | 1 | ○ | ○ | 137 | — | — | X |
| Example | 84 | X | — | — | — | — | — | — | — | — |

As shown in Tables 1–16, in the Examples of the present invention, a sound brazing sheet which exhibited good performance in the above evaluations, superior tensile strength during brazing, no cracking during press forming into a cup-like shape, and excellent corrosion resistance in which no leakage (perforation) occurred in the brazed products in the corrosion test of 2500 hours or more was obtained. On the contrary, the materials and brazing sheets in Comparative Examples exhibited at least one inferior performance in the evaluations.

Examples 85–112

An aluminum alloy for a core material shown in Table 1 (composition of Examples 1–6), an aluminum alloy for an intermediate layer material shown in Table 2 (composition of Examples 21–36), and an aluminum alloy for a filler material shown in Table 4 having a composition of a JIS 4104 alloy as an essential component (composition of Examples 51–58) were respectively cast by semi-continuous casting and treated in the same manner as in Example 1.

These materials were laminated in the combinations shown in Examples 85–100 in Table 17 and Examples 101–112 in Table 19 in the order of filler material, core material, intermediate layer material, and filler material while changing the hardness of the core material. These materials were processed into clad materials (brazing sheets) in the same manner as in the above Example 1. Each brazing sheet was fabricated into a brazed product.

In the same manner as in the above Example 1, (1) rolling and hot rolling characteristics, (2) fabrication stability, (3) thickness of the intermediate layer material and its ratio, (4) grain size of intermediate layer material (raw material), (5) grain size of intermediate layer material (after vacuum brazing), (6) hardness ratio, (7) press formability, (8) brazability, (9) tensile strength after vacuum brazing, (10) Zn concentration at interface between core material and intermediate layer material, (11) average Zn concentration in core material, and (12) corrosion resistance were evaluated. In the evaluation of (6) hardness ratio, the ratio of the micro-Vickers hardness of the core material in a raw material state to that of the core material in a fully-annealed state was adjusted to 1 or more by performing final annealing at a temperature lower than the recrystallization temperature of the core material, specifically at 200–350° C.

Comparative Examples 113–114

Clad materials (brazing sheets) were obtained using the materials of Example 105 under the same conditions except for changing the hardness ratio of the core material to outside the range of the present invention. Each brazing sheet was fabricated into a brazed product. Performances of the brazing sheets were evaluated in the same manner as in the Examples.

The results of the evaluations in Examples and Comparative Examples are shown in Tables 17–20.

TABLE 17

|  |  | Filler material 80 μm | Core material 260 μm | Intermediate layer material 80 μm | Filler material 80 μm | Ratio of intermediate layer material | Grain size of intermediate layer material μm | |
|---|---|---|---|---|---|---|---|---|
|  |  |  |  |  |  |  | Raw material | After vacuum brazing |
| Example | 85 | 51 | 5 | 30 | 51 | 0.31 | 151 | 206 |
|  | 86 | 51 | 6 | 30 | 56 | 0.31 | 141 | 206 |
|  | 87 | 51 | 5 | 30 | 57 | 0.31 | 148 | 206 |
|  | 88 | 51 | 6 | 30 | 58 | 0.31 | 145 | 206 |
|  | 89 | 51 | 5 | 31 | 51 | 0.31 | 154 | 212 |
|  | 90 | 51 | 6 | 31 | 56 | 0.31 | 146 | 212 |
|  | 91 | 51 | 5 | 31 | 57 | 0.31 | 151 | 212 |
|  | 92 | 51 | 6 | 31 | 58 | 0.31 | 149 | 212 |
|  | 93 | 51 | 5 | 32 | 51 | 0.31 | 142 | 194 |
|  | 94 | 51 | 6 | 32 | 56 | 0.31 | 134 | 194 |
|  | 95 | 51 | 5 | 32 | 57 | 0.31 | 139 | 194 |
|  | 96 | 51 | 6 | 32 | 58 | 0.31 | 137 | 194 |

TABLE 17-continued

|  | Filler material 80 μm | Core material 260 μm | Intermediate layer material 80 μm | Filler material 80 μm | Ratio of intermediate layer material | Grain size of intermediate layer material μm | |
|---|---|---|---|---|---|---|---|
|  |  |  |  |  |  | Raw material | After vacuum brazing |
| 97 | 51 | 5 | 33 | 51 | 0.31 | 150 | 206 |
| 98 | 51 | 6 | 33 | 56 | 0.31 | 143 | 206 |
| 99 | 51 | 5 | 33 | 57 | 0.31 | 147 | 206 |
| 100 | 51 | 6 | 33 | 58 | 0.31 | 145 | 206 |

TABLE 18

|  |  | Hot rolling characteristics | Fabrication stability | Hardness ratio | Press formability | Brazability | Tensile strength after vacuum brazing | Zn concentration at interface | Average Zn concentration | Corrosion resistance |
|---|---|---|---|---|---|---|---|---|---|---|
| Example | 85 | ○ | ○ | 1.19 | ○ | ○ | 139 | 0.92 | 0.02 | ◎ |
|  | 86 | ○ | ○ | 1.71 | ○ | ○ | 138 | 0.92 | 0.03 | ◎ |
|  | 87 | ○ | ○ | 1.38 | ○ | ○ | 139 | 0.92 | 0.02 | ◎ |
|  | 88 | ○ | ○ | 1.52 | ○ | ○ | 138 | 0.92 | 0.03 | ◎ |
|  | 89 | ○ | ○ | 1.23 | ○ | ○ | 143 | — | — | ◎ |
|  | 90 | ○ | ○ | 1.63 | ○ | ○ | 142 | — | — | ◎ |
|  | 91 | ○ | ○ | 1.40 | ○ | ○ | 143 | — | — | ◎ |
|  | 92 | ○ | ○ | 1.51 | ○ | ○ | 142 | — | — | ◎ |
|  | 93 | ○ | ○ | 1.21 | ○ | ○ | 142 | — | — | ◎ |
|  | 94 | ○ | ○ | 1.65 | ○ | ○ | 141 | — | — | ◎ |
|  | 95 | ○ | ○ | 1.36 | ○ | ○ | 142 | — | — | ◎ |
|  | 96 | ○ | ○ | 1.48 | ○ | ○ | 141 | — | — | ◎ |
|  | 97 | ○ | ○ | 1.25 | ○ | ○ | 142 | 0.83 | 0.02 | ◎ |
|  | 98 | ○ | ○ | 1.61 | ○ | ○ | 141 | 0.83 | 0.03 | ◎ |
|  | 99 | ○ | ○ | 1.42 | ○ | ○ | 142 | 0.83 | 0.02 | ◎ |
|  | 100 | ○ | ○ | 1.53 | ○ | ○ | 141 | 0.83 | 0.03 | ◎ |

TABLE 19

|  |  | Filler material 80 μm | Core material 260 μm | Intermediate layer material 80 μm | Filler material 80 μm | Ratio of intermediate layer material | Grain size of intermediate layer material μm | |
|---|---|---|---|---|---|---|---|---|
|  |  |  |  |  |  |  | Raw material | After vacuum brazing |
| Example | 101 | 51 | 5 | 34 | 51 | 0.31 | 162 | 224 |
|  | 102 | 51 | 6 | 34 | 56 | 0.31 | 154 | 224 |
|  | 103 | 51 | 5 | 34 | 57 | 0.31 | 158 | 224 |
|  | 104 | 51 | 6 | 34 | 58 | 0.31 | 156 | 224 |
|  | 105 | 51 | 5 | 35 | 51 | 0.31 | 167 | 230 |
|  | 106 | 51 | 6 | 35 | 56 | 0.31 | 160 | 230 |
|  | 107 | 51 | 5 | 35 | 57 | 0.31 | 166 | 230 |
|  | 108 | 51 | 6 | 35 | 58 | 0.31 | 163 | 230 |
|  | 109 | 51 | 5 | 36 | 51 | 0.31 | 135 | 188 |
|  | 110 | 51 | 6 | 36 | 56 | 0.31 | 129 | 188 |
|  | 111 | 51 | 5 | 36 | 57 | 0.31 | 133 | 188 |
|  | 112 | 51 | 6 | 36 | 58 | 0.31 | 131 | 188 |
| Comparative | 113 | 51 | 5 | 35 | 51 | 0.31 | 163 | 230 |
| Example | 114 | 51 | 5 | 35 | 51 | 0.31 | 154 | 230 |

TABLE 20

|  |  | Hot rolling characteristics | Fabrication stability | Hardness ratio | Press formability | Brazability | Tensile strength after vacuum brazing | Zn concentration at interface | Average Zn concentration | Corrosion resistance |
|---|---|---|---|---|---|---|---|---|---|---|
| Example | 101 | ○ | ○ | 1.27 | ○ | ○ | 138 | 0.77 | 0.02 | ◎ |
|  | 102 | ○ | ○ | 1.67 | ○ | ○ | 137 | 0.77 | 0.03 | ◎ |
|  | 103 | ○ | ○ | 1.46 | ○ | ○ | 138 | 0.77 | 0.02 | ◎ |
|  | 104 | ○ | ○ | 1.55 | ○ | ○ | 137 | 0.77 | 0.03 | ◎ |
|  | 105 | ○ | ○ | 1.29 | ○ | ○ | 142 | — | — | ◎ |
|  | 106 | ○ | ○ | 1.59 | ○ | ○ | 141 | — | — | ◎ |
|  | 107 | ○ | ○ | 1.34 | ○ | ○ | 142 | — | — | ◎ |
|  | 108 | ○ | ○ | 1.47 | ○ | ○ | 141 | — | — | ◎ |
|  | 109 | ○ | ○ | 1.31 | ○ | ○ | 139 | 0.63 | 0.02 | ◎ |

TABLE 20-continued

|  |  | Hot rolling characteristics | Fabrication stability | Hardness ratio | Press formability | Brazability | Tensile strength after vacuum brazing | Zn concentration at interface | Average Zn concentration | Corrosion resistance |
|---|---|---|---|---|---|---|---|---|---|---|
|  | 110 | ○ | ○ | 1.69 | ○ | ○ | 138 | 0.63 | 0.03 | ◎ |
|  | 111 | ○ | ○ | 1.44 | ○ | ○ | 139 | 0.63 | 0.02 | ◎ |
|  | 112 | ○ | ○ | 1.58 | ○ | ○ | 138 | 0.63 | 0.03 | ◎ |
| Comparative | 113 | ○ | ○ | 1.03 | ○ | X | — | — | — | X |
| Example | 114 | ○ | ○ | 1.88 | X | — | — | — | — | — |

As is clear from Tables 17–20, the brazing sheets in the Examples exhibited superior performance in the evaluations. On the contrary, the brazing sheets in the Comparative Example exhibited at least one inferior performance in the evaluations.

According to the present invention, an aluminum alloy clad material for vacuum brazing which excels in corrosion resistance, clad rolling characteristics, formability, brazability, and strength after brazing can be provided. The brazing sheet is suitable as a fluid passage material for aluminum alloy heat exchangers, in particular, as a core plate material for a drawn-cup type heat exchanger and the like. Use of the brazing sheet can reduce the thickness as well as the weight of the materials for heat exchangers.

Obviously, numerous modifications and variations of the present invention are possible in light of the above teachings. It is therefore to be understood that, within the scope of the appended claims, the invention may be practiced otherwise than as specifically described herein.

What is claimed is:

1. An aluminum alloy brazing sheet with a quad-layer structure consisting of an outer filler material, intermediate layer material, core material, and inner filler material, laminated in that order from the outer surface, wherein the core material consists of 0.5–1.6% of Mn, 0.10–0.50% of Cu, 0.05–0.50% of Mg, and 0.06–0.30% of Ti, and, as impurities, 0.5% or less of Fe, 0.5% or less of Si, and 0.1% or less of Zn, with the remainder being Al and unavoidable impurities; the intermediate layer material consists of 0.2–1.5% of Mg and at least one of 0.5–4% of Zn, 0.005–0.2% of In, and 0.01–0.2% of Sn, and, as impurities, 0.3% or less of Si, 0.3% or less of Fe, 0.05% or less of Cu, 0.05% or less of Mn, and 0.3% or less of Ti, with the remainder being Al and unavoidable impurities, wherein the thickness of the intermediate layer material is 50 μm or more and no greater than the thickness of the core material, the outer filler material is an Al—Si—Mg alloy containing 0.005–0.2% of In and the inner filler material is an Al—Si—Mg alloy.

2. The aluminum alloy brazing sheet according to claim 1, wherein the average grain size of the intermediate layer material is 60 μm or more.

3. The aluminum alloy brazing sheet according to claim 1, wherein the ratio of the micro-Vickers hardness of the core material to that of the core material in a fully-annealed state is 1.15–1.75.

4. A heat exchanger fabricated by using the brazing sheet according to claim 1, wherein the intermediate layer has an average grain size of at least 80 μm after heating for brazing over the entire section.

5. The aluminum alloy brazing sheet of claim 1, wherein the outer filler material additionally contains 0.01–0.2% of Sn.

6. An aluminum alloy brazing sheet with a quad-layer structure consisting of an outer filler material, intermediate layer material, core material and inner filler material, laminated in that order from the outer surface, wherein the core material consists of 0.5–1.6% of Mn, 0.10–0.50% of Cu, 0.05–0.50% of Mg, and 0.06–0.30% of Ti, and, as impurities, 0.5% or less of Fe, 0.5% or less of Si, and 0.1% or less of Zn, with the remainder being Al and unavoidable impurities; the intermediate layer material consists of 0.2–1.5% of Mg and at least one of 0.5–4% of Zn, 0.005–0.2% of In, and 0.01–0.2% of Sn, and, as impurities, 0.3% or less of Si, 0.3% or less of Fe, 0.05% or less of Cu, 0.05% or less of Mn, and 0.3% or less of Ti, with the remainder being Al and unavoidable impurities, and having a thickness of 50 μm or more, which is no greater than the thickness of the core material, and an average grain size after heating for brazing of 80 μm or more; the outer filler material is an Al—Si—Mg alloy containing 0.005–0.2% of In and the inner filler material is an Al—Si—Mg alloy.

7. The aluminum alloy brazing sheet of claim 6, wherein the outer filler material additionally contains 0.01–0.2% of Sn.

8. An aluminum alloy brazing sheet with a quad-layer structure consisting of an outer filler material, intermediate layer material, core material and inert filler material, laminated in that order from the outer surface, wherein the core material consists of 0.5–1.6% of Mn, 0.10–0.50% of Cu, 0.05–0.50% of Mg, and 0.06–0.30% of Ti, and, as impurities, 0.5% or less of Fe, 0.5% or less of Si, and 0.1% or less of Zn, with the remainder being Al and unavoidable impurities and the ratio of the micro-Vickers hardness of the core material to that of the core material in a fully-annealed state is 1.15–1.75; the intermediate layer material consists of 0.2–1.5% of Mg and at least one of 0.5–4% of Zn, 0.005–0.2% of In, and 0.01–0.2% of Sn, and, as impurities, 0.3% or less of Si, 0.3% or less of Fe, 0.05% or less of Cu, 0.05% or less of Mn, and 0.3% or less of Ti, with the remainder being Al and unavoidable impurities, and having a thickness of 50 μm or more, which is no greater than the thickness of the core material, and an average grain size after heating for brazing of 80 μm or more; the outer filler material is an Al—Si—Mg alloy containing 0.005–0.2% In and the inner filler material is an Al—Si—Mg alloy.

9. The aluminum alloy brazing sheet of claim 8, wherein the outer filler material additionally contains 0.01–0.2% of Sn.

* * * * *